Figure 3:
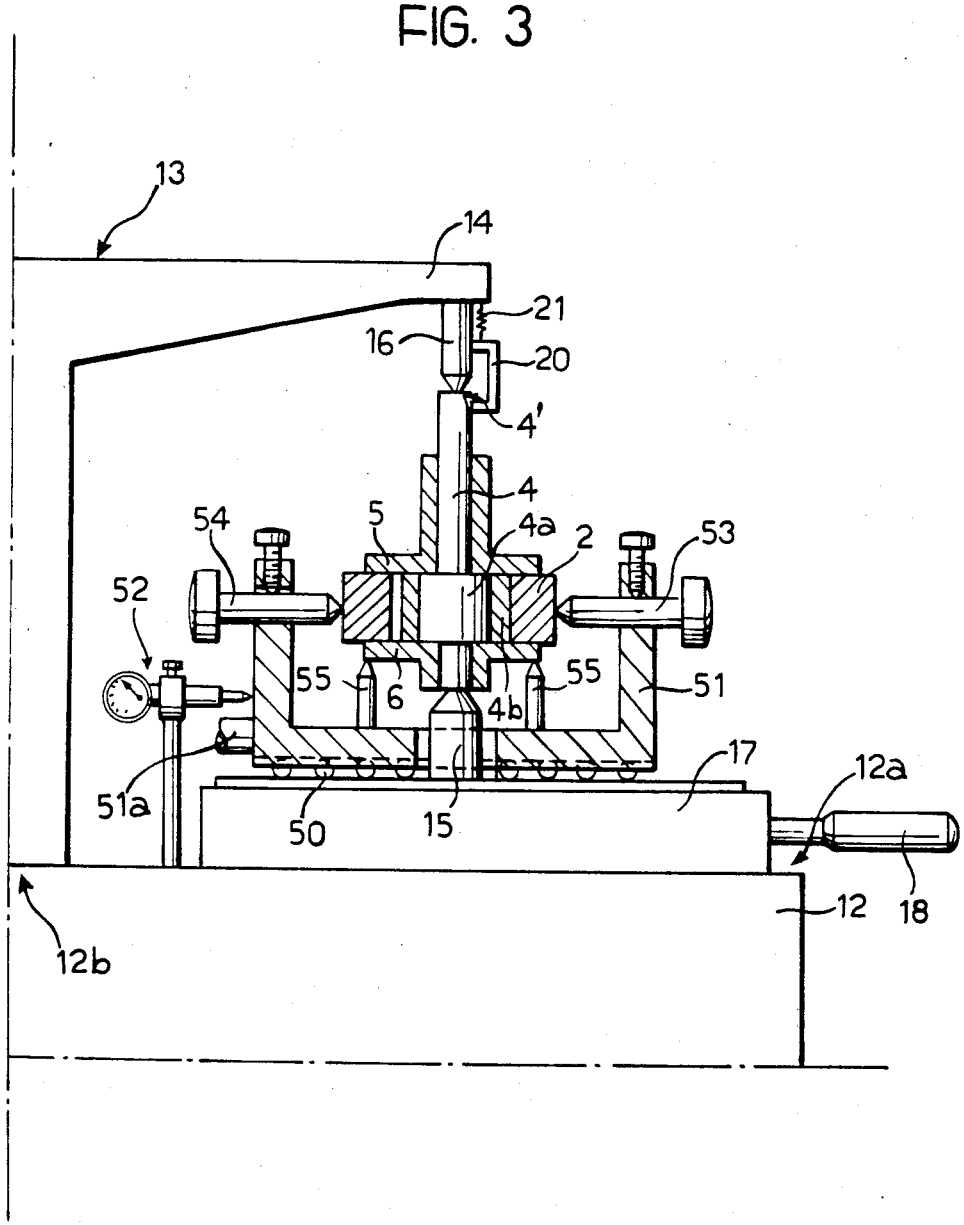

United States Patent [19]

Zgliczynski et al.

[11] Patent Number: 4,706,353
[45] Date of Patent: Nov. 17, 1987

[54] METHOD AND APPARATUS FOR THE ASSEMBLY OF ROTARY COMPRESSORS PARTICULARLY FOR MOTOR COMPRESSOR UNITS FOR REFRIGERATORS AND THE LIKE

[75] Inventors: Marek Zgliczynski, Turin; Giancarlo Sesona, Venaria, both of Italy

[73] Assignee: Aspera S.r.l., Turin, Italy

[21] Appl. No.: 924,465

[22] Filed: Oct. 29, 1986

[30] Foreign Application Priority Data

Oct. 29, 1985 [IT] Italy ................................ 67912 A/85

[51] Int. Cl.$^4$ ........................ B23P 15/00; B23P 21/00
[52] U.S. Cl. ........................ 29/156.4 R; 29/33 K; 29/240; 29/281.1; 29/407; 29/434; 29/464; 29/525; 29/705; 29/721
[58] Field of Search ............... 29/33 K, 156.4 R, 240, 29/281.1, 407, 434, 464, 525, 700, 705, 720, 721

[56] References Cited

U.S. PATENT DOCUMENTS

| | | | |
|---|---|---|---|
| 4,547,131 | 10/1985 | Riffe et al. | 29/156.4 R X |
| 4,575,319 | 3/1986 | Terauchi | 29/156.4 R X |
| 4,584,750 | 4/1986 | Ozu et al. | 29/156.4 R |
| 4,649,611 | 3/1987 | Ikeda et al. | 29/720 X |

*Primary Examiner*—Howard N. Goldberg
*Assistant Examiner*—Ronald S. Wallace
*Attorney, Agent, or Firm*—Sughrue, Mion, Zinn, Macpeak and Seas

[57] ABSTRACT

A method for and an apparatus for assembly of rotating ring rotary compressors is disclosed. A cylinder, shaft, roller and supports are initially assembled together, fixing means being kept in a slackened position. A preliminary centering operation is then carried out for bringing the axis of the shaft into a diametral plane of the cylinder constituting a predetermined reference plane. This operation is carried out by orientation of the shaft into two angular positions spaced from each other by 180°. The shaft is then oriented relative to the cylinder, the region of maximum eccentricity of the core being brought into the said reference plane. The support and the cylinder (this latter with the interposition of the roller) are then pressed onto the shaft by a thrust exerted in the said predetermined plane. They are thus brought into and held in a position of firm mutual contact: the cylinder on the roller, the roller on the eccentric core of the shaft and the support on the shaft at the sides of the eccentric core. The shaft and the support being kept in the position of firm contact, the cylinder is then given a relative movement of a predetermined magnitude in the opposite direction from the direction of the force previously exerted. The magnitude of this movement identifies the minimum aperture which is established, in use, between the outer surface of the roller and the wall of the compression chamber.

8 Claims, 7 Drawing Figures

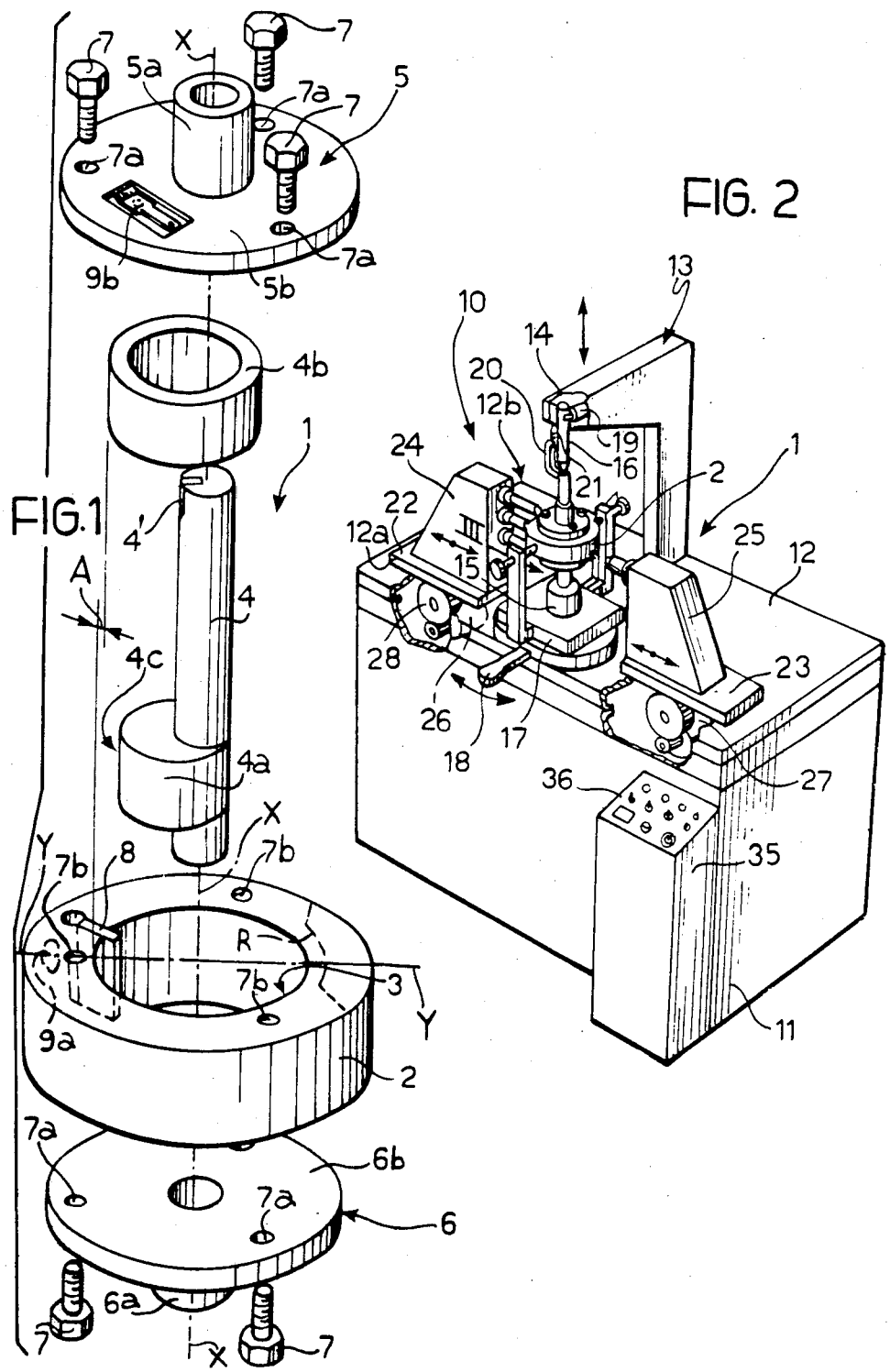

METHOD AND APPARATUS FOR THE ASSEMBLY OF ROTARY COMPRESSORS PARTICULARLY FOR MOTOR COMPRESSOR UNITS FOR REFRIGERATORS AND THE LIKE

DESCRIPTION

The present invention relates in general to rotating ring rotary compressors such as, for example, rotary compressors used in hermetic compressor units for refrigerators and the like.

In a now classic configuration, such compressors comprise, as component parts:

a cylinder with a wall defining a compression chamber with a main central axis, a rotary shaft having an eccentric core for orbiting within the compression chamber of the cylinder and having a region of maximum eccentricity relative to the shaft, a roller fitted around the eccentric core of the shaft, first and second supports with overall tubular structures disposed on opposite sides of the cylinder for supporting the rotary shaft in its position of rotation, and fixing means (typically constituted by screws) acting between the cylinder and the first and second supports and capable of being brought into a closed position to clamp the cylinder and the first and second supports in a final position of assembly.

In the production of a motor compressor unit the assembly of the compressor constitutes a very delicate and exacting phase.

It is in fact necessary to ensure that the constituent parts of the compressor are locked in the final position of assembly while respecting several essential conditions for the operating ability of the compressor.

In particular it is necessary to ensure that, during the orbital movement within the compression chamber, the outer surface of the roller fitted around the eccentric core of the shaft never touches the wall of the compression chamber. At the same time it is necessary to prevent the outer surface of the roller and the wall of the compression chamber being spaced apart by too wide an opening during the portion of the orbital movement corresponding to the final phases of compression, so as to avoid appreciable drawing of the gas which is compressed through the opening itself.

Usually, in order to ensure that these strict assembly conditions are respected, the various components of each compressor are previously selected so that the parts selected for the assembly of each compressor have dimensional tolerances such as to ensure the relative couplings.

The assembly of the compressor however requires the effecting of precise measurements and particularly delicate adjusting operations.

There is thus a need to provide a method for the assembly of such rotary compressors which can be carried out quickly, preferably automatically, while ensuring the precision of the final result obtained.

The object of the present invention is to satisfy this requirement.

According to the present invention, this object is achieved by a method for the assembly of rotary compressors of the type specified above, characterised in that it comprises, in order, the steps of:

bringing together the cylinder, the shaft, the roller and the first and second supports, the fixing means being kept away from the position of closure, orienting the shaft relative to the cylinder, the region of maximum eccentricity of the eccentric core being brought into a reference plane passing through the main central axis and having a predetermined angular position relative to the cylinder, exerting a relative force between the rotary shaft on the one hand and the cylinder and the first and second supports on the other hand oriented in the direction of the said reference plane and in the direction corresponding to the bringing of the region of maximum eccentricity of the eccentric core of the shaft closer to the portion of the wall of the cylinder facing it until the shaft is brought into firm contact with the roller and the first and second supports and the roller is brought into firm contact with the cylinder, maintaining the shaft and the first and second support in the said position of firm contact, causing a relative movement of the cylinder with respect to the shaft of a predetermined magnitude oriented in the direction of the said reference plane and in the direction opposite the direction of the said relative force, and moving the fixing means into the closed position.

The invention also provides apparatus usable for assembling compressors of the type specified above, preferably by the method including the steps listed above.

The apparatus according to the invention is characterised in that it comprises:

a framework having support means for holding the axis of the shaft stationary, the shaft having been assembled together with the cylinder, the roller and the first and second supports, first thrust means mounted on the framework and able to act on the cylinder and on the first and second supports assembled with the shaft and with the roller in a reference plane passing through the said main central axis, stop means for keeping the shaft and the first and second supports in a temporary relative fixed position, and second thrust means mounted on the framework and able to act on the cylinder in the said reference plane and in the opposite direction from the first thrust means.

In the present specification and in the following claims, the terms "to assemble together", "assembled together", etc. are used to refer to the condition in which the component parts of the compressor are arranged in the assembled position while however allowing small relative movements to allow adjustment of the so-called "offset". Starting from the "assembled together" condition, after the relative positions of the component parts have been adjusted precisely, the compressor is finally assembled by the placing of the fixing means (screws) which act between the cylinder and the first and second supports in the closed position.

The invention will now be described purely by way of non-limiting example, with reference to the appended drawings, in which:

FIG. 1 is an exploded perspective view of a rotating ring rotary compressor for assembly by the method and the apparatus according to the invention, FIG. 2 illustrates the apparatus of the invention schematically, and FIGS. 3 to 7 illustrate schematically the successive steps in the method of the invention carried out with the use of the apparatus of FIG. 2.

In FIG. 1 a rotary compressor of the type generally used in hermetic compressor units for refrigerators and the like is generally indicated 1. The compressor 1 includes, as essential parts:

a cylinder 2 with an internal cylindrical wall 3 which defines the peripheral wall of a cylindrical compression chamber having a main central axis indicated X—X, a shaft 4 intended to rotate about its own axis and including an eccentric core 4a which can effect an orbital movement within the chamber of the cylinder 2 as a result of the rotation of the shaft 4, a rotary ring 4b (generally termed a roller) fitted around the eccentric core 4a, a first support 5 having a central tubular core 5a for supporting the shaft 4 for rotation and a peripheral flange 5b which enables the support 5 to be fixed to one side of the cylinder 2 and defines one of the end walls of the compression chamber, a second support 6 also comprising a tubular core 6a for supporting the shaft 4 and a flange 6b for fixing it to the other side of the cylinder 2 to define the other end wall of the compression chamber, and finally a series of screws, generally indicated 7, for extending through corresponding holes 7a and 7b provided in the supports 5 and 6 and in the cylinder 2 to clamp these elements in the final assembled position.

Naturally, the screws 7 may be replaced by other functionally equivalent fixing means such as spot welds.

As already indicated above, the structure of the compressor 1 should be considered as generally known.

In particular, the term "cylinder"—reserved for the part 2—relates essentially to the conformation and function of the inner wall 3. While keeping a generally annular or toroidal shape, the outer surface of the cylinder 2 may have notches, cavities and recesses for reducing the overall volume of the cylinder 2, thus reducing its weight. The possible profile of one of these hollows, cavities or recesses is schematically indicated in broken outline at R in FIG. 1.

Within the cylinder 2 is slidable in a generally radial direction relative to the wall 3, the so-called vane 8 which ensures the sealed separation of the two volumes, intake and exhaust respectively, into which the chamber defined by the wall 3 is divided during the operation of the compressor.

The compression chamber defined by the wall 3 and the flanges 5b and 6b of the supports 5 and 6 communicates with the exterior through an intake aperture 9a extending through the wall of the cylinder. Gases to be compressed flow through the aperture 9a into the compression chamber in which the roller 4b mounted on the eccentric core 4a of the shaft orbits. The compressed gases leave the compression chamber through a valve 9b, normally of the flap type, provided on one of the supports 5, 6 or possibly in the wall of the cylinder 2. In order to ensure the correct operation of the compressor it is necessary to establish precise relative positioning of the component parts during assembly of the parts themselves.

In particular, the final position of fixing of the supports 5 and 6 on the cylinder 2 must be such that, during its orbital movement within the compression chamber, the outer surface of the roller 4b and in particular the portion thereof located in the region of maximum eccentricity of the core 4a—a region indicated 4c—never touches the wall 3 itself.

At the same time it is necessary to avoid an excessive space (A in FIG. 1) opening between the wall 3 and the portion of the outer surface of the roller 4b located in the region of maximum eccentricity 4c of the core 4a, particularly in the region of the wall 3 in which the pressure difference between the intake and exhaust volumes is a maximum, that is the region identified approximately by the diametral plane indicated Y—Y in FIG. 1.

Again with reference to FIG. 1, a notch indicated 4' (acting as an angular reference) is provided at one of the ends of the shaft 4 in a predetermined angular position, for example the position coincident with the region of maximum eccentricity 4c of the core 4a.

The apparatus according to the invention, generally indicated 10, includes a framework 11 provided at its upper end with a table 12 which can be seen to have a front side 12a and a rear side 12b.

Starting from the rear side 12b of the table 12, from the framework 11 there projects upwardly a bracket support 13 having a horizontal arm the free end 14 of which overlies the front side 12a of the table 12.

On the free end 14 of the arm 13 and on the part of the table 12 underlying it there are mounted two elements 15, 16 of a stock - tailstock complex which allows the compressor 1 to be clamped on the apparatus 10 during assembly.

The compressor 1 is mounted in the apparatus 10 in a condition in which its constituent elements (cylinder 2, shaft 4, roller 4b, supports 5 and 6, screws 7) are assembled together, that is coupled in the assembled arrangement so that they can be moved slidingly relative to each other in a generally radial direction relative to the axis X—X.

In practice, the compressor 1 is mounted in the apparatus 10 with all its component parts already connected together but with the screws 7 left slack.

The stock-tailstock complex 15, 16 carries associated elements which allow the relative arrangement of the shaft and the cylinder 2 to be adjusted precisely to a predetermined relative angular position.

In the embodiment illustrated, the lower element 15 of the complex is mounted on a platform 17 which rests on the table 12 and may be oriented relative to the table 12 itself by means of a handgrip 18 which projects from the front side of the apparatus 10.

The angular adjustment of the platform 17 is illustrated schematically by a double arrow in FIG. 2.

The orientation of the platform 17 allows the cylinder 2 to be moved into a predetermined angular position relative to the plane 12.

The upper element 16 of the stock-tailstock complex has an associated motor unit 19 which enables the element 16 to be raised and lowered relative to the table 12 and for the element 16 to be rotated about its vertical axis.

The element 16 also has an associated pivotable fork 20 which is urged by a spring 21 into a position of engagement with the notch 4' provided at the upper end of the shaft 4.

The engagement of the fork 20 in the notch 4' ensures that the shaft is mounted on the apparatus in a predetermined angular position relative to the apparatus itself and, consequently, relative to the cylinder 2 and also allows the shaft 4 to be rotated by the element 16.

As best seen in FIG. 3, which is a view taken on the arrow III of FIG. 2, a device 51 is mounted on a sliding guide 50 of ball or prismatic type above the platform 17, the device 51 being able to effect a controlled translational movement in a generally front-rearward direction relative to the plane 12 under the action of a control 51a only partially visible in the drawing. The magnitude of this movement is detected by a micrometer 52.

The device 51 carries, mounted in a generally forked configuration, two clamping elements 53 and 54 which can clamp the cylinder 2 between them.

Above the device 51 there are also provided sprung support elements 55 for pressing the support 6 against the cylinder 2, urging the support upwardly.

Two horizontal rails or guides 22, 23 are provided on the table 12 in alignment with the stock-tailstock 15 and 16, to the left and the right respectively of the stock-tailstock unit 15 and 16. Two thrust devices indicated 24 and 25 respectively are mounted on the guides 22, 23.

The movement of the devices 24 and 25 along the guides 22 and 23 is driven manually or preferably automatically. For example, the devices 24 and 25 may be driven by electric motors 26, 27 mounted within the apparatus 10 beneath the table 12 and connected to the devices 24 and 25 by gear assemblies 28, 29.

On the device 24, which in FIGS. 2 and 4 to 7 is illustrated on the left hand side, three thrust elements 30, 31 and 32 are mounted for acting on the support 5, on the cylinder 2 and on the support 6 respectively.

Figure 4:
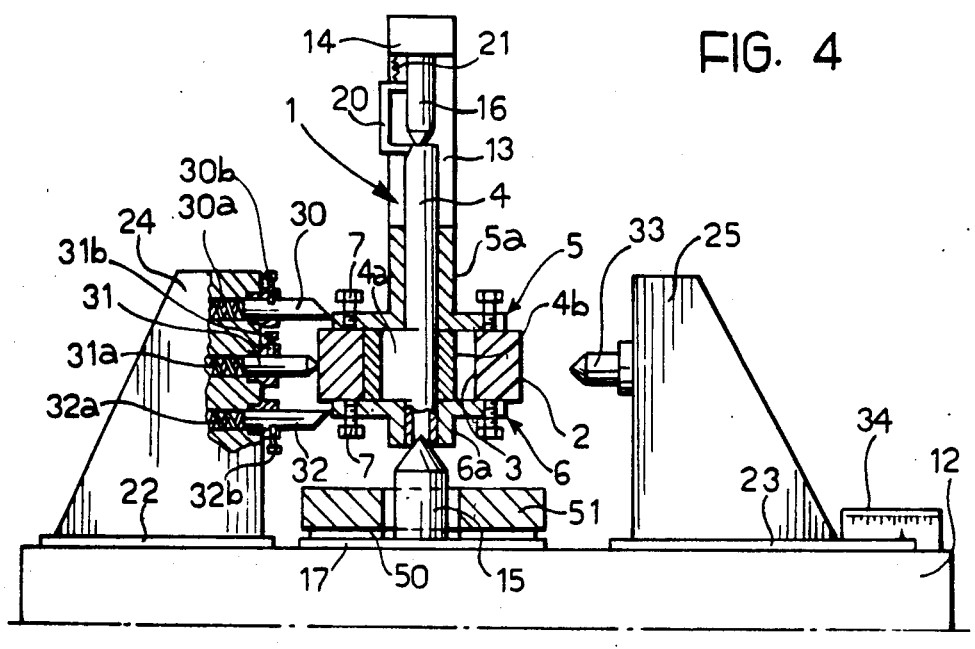
Figure 5:
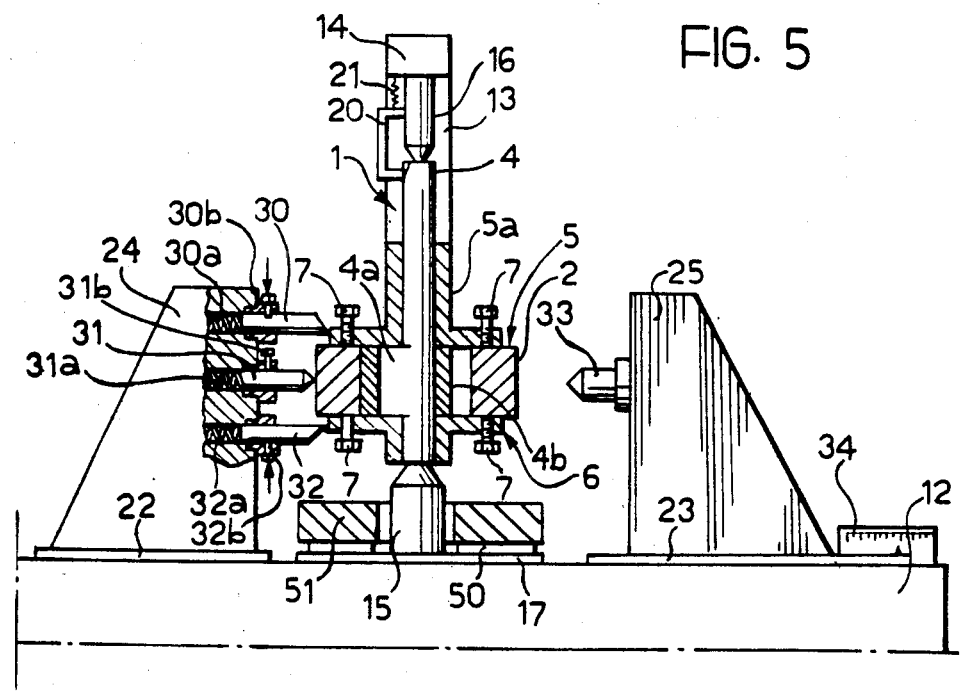
Figure 6:
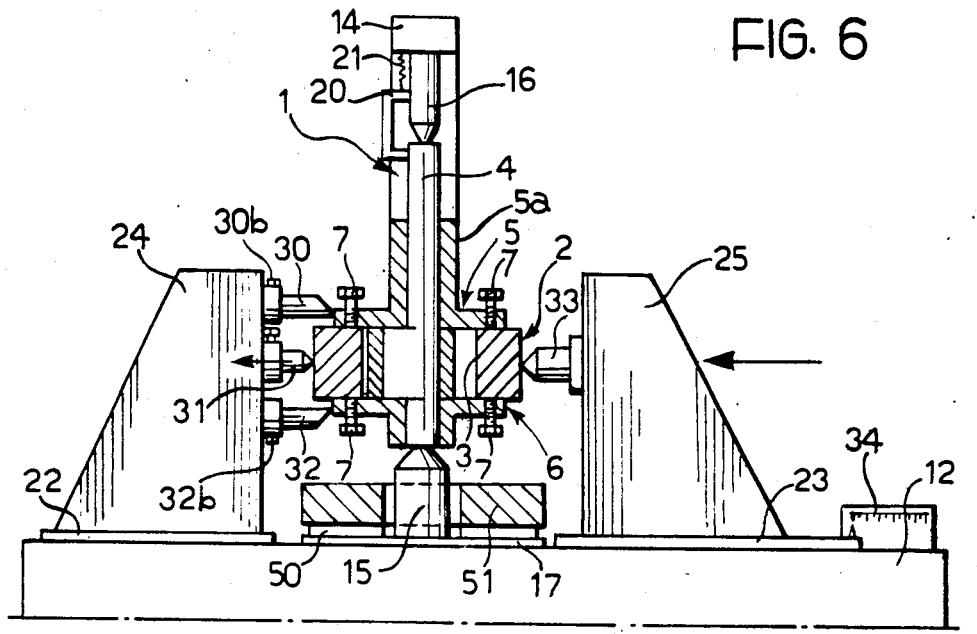
Figure 7:
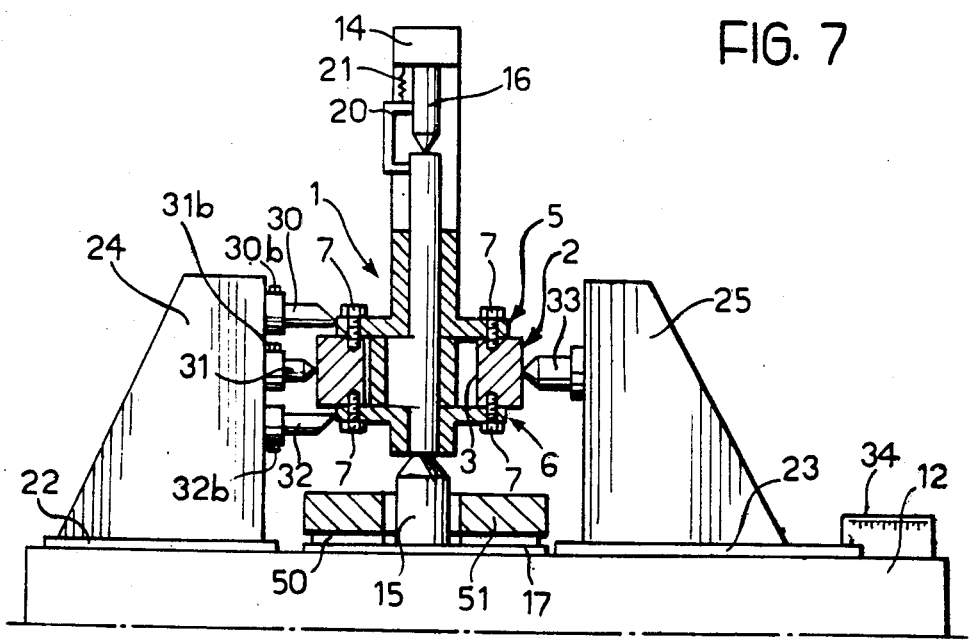

As is best seen in FIG. 4, each of the elements 30, 31, 32 comprises a pusher which is mounted within a horizontal chamber within the device 24.

At the inwardly facing end of the device 24, the pushers of the elements 30, 31 and 32 bear against respective helical springs 30a, 31a and 32a.

Each of the elements 30, 31, and 32 although being able to exert a thrust, is able to yield resiliently (to a small extent) under the reaction opposed to the thrust itself by the body of the compressor 1.

The sprung assembly of the pushers of the thrust elements 30 and 32, intended to act on the supports 5 and 6, constitute a preferred characteristic which enables excessive rigidity of the force exerted by the device 24 on the supports 5 and 6 to be avoided.

The pushers of both the thrust elements 30, 32 have associated stop members illustrated schematically in the form of screws 30b and 32b which enable the pushers to be clamped to the body of the device 24 stopping their sliding movement within the respective chambers.

The yieldability of the central thrust element 31 intended to act on the cylinder 2 caused by the possibility of contraction of the spring 31a is however essential for the operation of the device as will be best seen below. The central thrust element 31 has an associated respective stop member 31b which can be likened to the stop members 30b, 32b.

The thrust device 25 located on the opposite side from the compressor 1 (right hand in FIGS. 3 to 7) includes a single thrust element 33 for acting on the cylinder 2.

The device 25 has a further associated micrometer illustrated schematically here in the form of a graduated scale or vernier 34 which enables the magnitude of the movement of the device 25 and particularly of the thrust element 33 to be measured precisely.

The direction of movement of the thrust devices 24 and 25 is indicated by the double arrows in FIG. 1.

A control member such as an electric or electropneumatic control unit is generally indicated 35 and is controlled by a microprocessor provided with a control panel 36. The control unit 35 controls the operation of the apparatus 10 automatically and cyclically to carry out the method for assembling a compressor 1.

The cycle for assembling a compressor will now be described.

At the beginning of the assembly operation for the compressor, the elements of the stock-tailstock complex 15, 16, the clamping elements 53 and 54 and the thrust devices 24 and 25 are in the condition of maximum slackening so that the compressor 1 may be introduced freely into the central position between them.

The compressor 1 is located in the apparatus 10 (manually by a skilled worker or automatically by a robot arm or equivalent device) after it has been assembled together, that is after its component parts (cylinder, shaft, roller, supports) have been connected or coupled but not yet firmly clamped to each other by the tightening of the screws 7.

The compressor 1 is located in the apparatus 10 with the end of the shaft 4 provided with a notch 4' facing upwardly, the notch itself being positioned in engagement with the fork 20 which is kept (by controlled rotation of the element 16) in a predetermined plane, for example aligned with the guides 22 and 23. At the same time the cylinder 2 is oriented (for example by means of an automatic positioning member not illustrated) in a predetermined angular position, which is selected according to the type of compressor, by orientation of the platform 17. In general the shaft 4 is oriented relative to the cylinder 2 with a region 4c of maximum eccentricity of the core 4a aligned with the plane Y—Y of the cylinder 2 and facing the thrust device 24.

At this point the clamping elements 53 and 54 are brought (manually or by a control given by the control unit 35) into a position of clamping the cylinder 2.

The shaft is then rotated by the motor 19 through an angle "alpha" (for example of the order of 90°) about its axis. The device 51 is then thrust by the control 51a towards the rear edge 12b of the table 12, bringing the inner wall 3 of the cylinder 2 into firm contact with the outer surface of the roller 4b and consequently bringing the inner surface of the roller 4b itself into firm contact with the outer surface of the eccentric core 4a of the shaft (FIG. 3).

After this first thrust, the reading of the micrometer 52 is noted.

The device 51 having been freed from the thrust action, the shaft is rotated by the motor 19 through an angle of 180° and thrust is then repeated in the opposite direction (second thrust action) on the device 51.

The reading of the micrometer 52 is then again noted so as to determine the magnitude of the sliding movement induced by the second thrust.

The device 51 is then withdrawn again (or thrust in the direction of the first thrust action) by an amount equal to half the sliding movement induced by the second thrust action.

The shaft is finally rotated again bringing it into the starting angular position.

The sequence of operation is intended to ensure that the central axis X—X of the cylinder 2 and the axis of the shaft 4 are made to lie exactly in the plane Y—Y.

When the compressor 1 has been located in the apparatus 10, with the cylinder 2 and the shaft 4 in the correct relative orientation, the central control unit 35 activates the motor 26 causing the thrust device 24 to advance towards the compressor 1 (FIG. 4).

The stocks 30, 31 and 32 are brought into engagement with the support 5, with the cylinder 6, and with the support 7 respectively, pressing them towards the shaft 4.

Thus the supports 5, 6 and the cylinder 2 are brought into firm contact with the portion of the shaft 4 facing them.

In particular, the wall 3 of the cylinder 2 is pressed against the roller 4b which in its turn presses against the region of maximum eccentricity 4c of the eccentric core 4a. This thrust corresponds in fact to the "displacement" of the clearances existing between the wall 3 of the cylinder 2, the roller 4b and the eccentric portion 4a of the shaft 4 entirely on the opposite side from the region of maximum eccentricity 4c.

At this point (FIG. 5) the locking elements 30b and 32b are brought (manually or as a result of a command imparted by the central control unit 35) into their closed position.

Thus the pushers of the pusher members 30 and 32 which act on the supports 5 and 6 are held in a fixed position relative to the device 24. The device is in its turn held in a fixed position relative to the table 12 on which, through the stock-tailstock unit 15, 16, the shaft 4 of the compressor 1 is fixed. Consequently, the closure of the clamping members 30b and 32b is equivalent to the establishment of a condition (temporary) of relative fixing between the supports 5, 6 and the shaft 4.

Under these conditions, the only element which keeps a capacity for movement, albeit limited, relative to the shaft 4 is the cylinder 2, which is kept in a position of contact with the eccentric portion of the shaft 4 by the thrust of the spring 31a associated with the element 31.

At this point, the second thrust device 25 is advanced towards the compressor 1 (FIG. 6) bringing the thrust member 33 into contact with the cylinder 2 and urging the cylinder 2 towards the thrust device 24 (that is in the opposite direction from that previously) against the biassing action of the spring 31a.

The magnitude of the movement given to the cylinder 2 is measured precisely by the micrometer 34. The magnitude of this movement determines univocally the width of the space (A) which it is intended to establish between the wall 3 of the cylinder 2 and the outer surface of the roller 4b in correspondence with the region of maximum eccentricity of the core 4a of the shaft 4.

After the precise relative positioning of the cylinder 2 relative to the shaft 4 has been obtained, the screws 7 are brought to their closed conditions (FIG. 7) clamping the supports 5 and 6 definitely relative to the cylinder 2.

Preferably, before the tightening of the screws 7, the stop member 31b associated with the pusher 31 is brought to its closed position, so as to avoid accidental movements of the cylinder 2.

With the tightening of the screws 7, the assembly of the compressor 1 is complete and it may be removed (manually or by a robot) from the apparatus 10 for subsequent working.

The removal of the assembled compressor 1 naturally requires the moving of the thrust devices 24, 25, the clamping elements 53 and 54 and the elements of the stock-tailstock complex 15, 16 which are then returned by the central control unit 35 to their initial position in which they are furthest apart, so as to allow the introduction of a new compressor 1 to be assembled into the apparatus 10 after the removal of the first compressor.

Naturally, the principle of the invention remaining the same, the constructional details and embodiments may be varied widely with respect to that described and illustrated without thereby departing from the scope of the invention.

What is claimed is:

1. Method for the assembly of a rotating ring rotary compressor, the compressor comprising:

a cylinder with a wall defining a compression chamber having a main central axis, a rotary shaft having an eccentric core for orbiting within the compression chamber, the core having a region of maximum eccentricity relative to the shaft, the shaft being supported in its position of rotation by means of first and second supports with overall tubular structures disposed on opposite sides of the cylinder, a roller fitted around the eccentric core of the shaft, and fixing means acting between the cylinder and the first and second supports capable of being brought into a closed position to clamp the cylinder and the first and second supports in a final position of assembly, the method including the steps of:

bringing together the cylinder, the shaft, the roller and the first and second supports while keeping the fixing means away from the position of closure, orienting the shaft relative to the cylinder, the region of maximum eccentricity of the eccentric core being brought into a reference plane passing through the said main central axis and having a predetermined angular position relative to the cylinder, exerting a relative force between the rotary shaft on the one hand and the cylinder and the first and second supports on the other hand oriented in the said reference plane and in the direction corresponding to the bringing of the region of maximum eccentricity of the eccentric core of the shaft closer to the portion of the wall of the cylinder facing it until the shaft is brought into firm contact with the roller and the first and second supports and the roller are brought into firm contact with the cylinder, maintaining the shaft and the first and second supports in the said position of firm contact, causing a relative movement of the cylinder with respect to the shaft of a predetermined magnitude oriented in the said reference plane and in the direction opposite the direction of the said relative force, and moving the said fixing means into the closed position.

2. Method according to claim 1, wherein before the relative force oriented in the said reference plane is exerted between the rotary shaft on the one hand and the cylinder and the first and second supports on the other hand, there are carried out the steps of:

rotating the shaft about its axis in a first step by a predetermined angle relative to the reference plane, exerting a first auxiliary force in a direction which does not coincide with the direction of the said reference plane between the cylinder and the shaft, bringing the shaft into the position of firm contact with the roller, and the roller into a position of firm contact with the cylinder, rotating the shaft a second time about its axis through an angle of 180°, exerting a second auxiliary force in the said direction which does not coincide with the direction of the said reference plane between the cylinder and the shaft in the opposite direction from the first auxiliary force, thus causing relative translational movement between the cylinder and the shaft until the shaft is brought into the position of firm contact with the roller and the roller is brought into firm contact with the cylinder, and exerting a third auxiliary force again in the said direction which does not coincide with the direction of the said reference plane in the same direction as the first auxiliary force, whereby a further relative translational movement is caused between the cylinder and the shaft, the magnitude of the said further relative translational movement being equal to half the magnitude of the said relative translational movement.

3. Apparatus for assembling a rotating ring rotary compressor, the compressor comprising:
   a cylinder with a wall defining a compression chamber having a main central axis,
   a rotary shaft having an eccentric core for orbiting within the compression chamber, the core having a region of maximum eccentricity relative to the shaft, the shaft being supported in its position of rotation by means of first and second supports with overall tubular structures disposed on opposite sides of the cylinder,
   a roller fitted around the eccentric core of the shaft, and
   fixing means acting between the cylinder and the first and second supports capable of being brought into a closed position to clamp the cylinder and the first and second supports in a final position of assembly, the apparatus comprising:
   a framework having support means for holding the axis of the shaft stationary, the shaft having been assembled together with the cylinder, the roller and the first and second supports,
   first thrust means mounted on the framework and able to act on the cylinder and on the first and second supports assembled with the shaft and with the roller in a reference plane passing through the said main central axis in a predetermined angular position relative to the cylinder,
   stop means for keeping the shaft and the first and second supports in a temporary relative fixed position, and
   second thrust means mounted on the framework and able to act on the cylinder in the said reference plane and in the opposite direction from the first thrust means.

4. Apparatus according to claim 3, wherein the second thrust means cause a movement of the cylinder and carry an associated micrometer for measuring the magnitude of the movement of the cylinder.

5. Apparatus according to claim 3, wherein the support means carry associated angular reference elements for holding the shaft with the said region of maximum eccentricity of the eccentric core in the said reference plane.

6. Apparatus according to claim 3, wherein the support means carry associated further angular reference elements for holding the cylinder in a selectively predetermined angular position.

7. Apparatus according to claim 3, wherein at least one of the said first thrust means acting on the cylinder carries an associated resilient member which allows the respective first thrust means to yield resiliently under the action of the second thrust means.

8. Apparatus according to claim 3, wherein the support means can allow a first rotation of the shaft about its axis through a predetermined angle and a subsequent second rotation of the shaft about its axis through an angle of 180°, and include auxiliary thrust means which can impart to the cylinder relative translational movements with respect to the shaft in a direction which does not coincide with the direction of the said reference plane, the said auxiliary thrust means carrying an associated micrometer for measuring the magnitude of the said relative translational movements.

* * * * *